(12) United States Patent
Redmon

(10) Patent No.: US 9,551,921 B2
(45) Date of Patent: *Jan. 24, 2017

(54) METHOD FOR DISPLAYING AN IMAGE

(71) Applicant: DRAPER INC., Spiceland, IN (US)

(72) Inventor: Shanon O. Redmon, Greenfield, IN (US)

(73) Assignee: DRAPER INC., Spiceland, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/331,914

(22) Filed: Jul. 15, 2014

(65) Prior Publication Data

US 2014/0325821 A1 Nov. 6, 2014

Related U.S. Application Data

(63) Continuation of application No. 13/758,377, filed on Feb. 4, 2013, now Pat. No. 8,776,416, which is a continuation of application No. 13/245,417, filed on Sep. 26, 2011, now Pat. No. 8,365,450, which is a continuation of application No. 11/070,071, filed on Mar. 2, 2005, now Pat. No. 8,024,881.

(60) Provisional application No. 60/551,812, filed on Mar. 10, 2004.

(51) Int. Cl.
   G01F 9/00       (2006.01)
   G03B 21/58      (2014.01)
   G09F 1/12       (2006.01)
   G09F 19/18      (2006.01)
   G09F 15/00      (2006.01)

(52) U.S. Cl.
   CPC ............ G03B 21/58 (2013.01); G09F 1/12 (2013.01); G09F 19/18 (2013.01); *G09F 15/0012* (2013.01); *Y10T 29/49826* (2015.01)

(58) Field of Classification Search
   CPC .. G09F 15/0062; G09F 15/0068; G09F 19/18; G09F 7/18; G09F 7/20
   USPC ........... 40/610, 607.04, 612; 403/322.4, 325, 403/326, 327, 330; 248/166, 440.1, 463, 464, 248/528, 150, 917; 135/74, 114, 120.3, 144
   See application file for complete search history.

(56) References Cited

U.S. PATENT DOCUMENTS

| 1,308,680 | A | * | 7/1919  | Price ................................ 40/610 |
| 1,336,638 | A |   | 4/1920  | Kutwicz |
| 1,336,639 | A | * | 4/1920  | Leonard ........................ 352/195 |
| 1,662,586 | A | * | 3/1928  | Newman ........................ 160/351 |
| 1,731,512 | A | * | 10/1929 | Verburg ......................... 403/33 |
| 2,827,955 | A | * | 3/1958  | Hurley .......................... 160/369 |

(Continued)

FOREIGN PATENT DOCUMENTS

JP  45-068625       3/1973
JP  48-018211 A     3/1973

(Continued)

OTHER PUBLICATIONS

Office Action dated Apr. 27, 2010 for Japanese Patent Application No. 2007-502852 filed Sep. 8, 2006; First Named Inventor, Shanon O. Redmon.

(Continued)

*Primary Examiner* — Shin Kim
(74) *Attorney, Agent, or Firm* — Faegre Baker Daniels LLP

(57) ABSTRACT

A display apparatus is disclosed that includes a screen and a frame system positioned to support the screen. The frame system includes a plurality of frame members, a hinge that couples the frame members together, and a lock that blocks relative movement of the frame members.

17 Claims, 8 Drawing Sheets

(56) References Cited

U.S. PATENT DOCUMENTS

| | | | |
|---|---|---|---|
| 2,893,768 A * | 7/1959 | Selig | G03B 15/07 |
| | | | 403/92 |
| 3,041,032 A * | 6/1962 | Wilcox | 248/170 |
| 3,187,373 A * | 6/1965 | Fisher | E05D 11/1007 |
| | | | 16/324 |
| 3,740,880 A * | 6/1973 | Sweet et al. | 40/610 |
| 3,863,521 A * | 2/1975 | Gatsos | B62K 21/16 |
| | | | 280/278 |
| 3,879,146 A * | 4/1975 | Mayer | A47C 1/026 |
| | | | 16/325 |
| 3,950,758 A * | 4/1976 | Mirrione | H01Q 1/08 |
| | | | 16/332 |
| 3,955,240 A * | 5/1976 | Schuh | E05D 11/1007 |
| | | | 16/326 |
| 4,040,181 A | 8/1977 | Johnson | |
| 4,121,605 A * | 10/1978 | Schmerl | A45B 9/00 |
| | | | 135/65 |
| 4,161,818 A | 7/1979 | Phelps | |
| 4,218,819 A | 8/1980 | Phelps | |
| 4,233,737 A | 11/1980 | Poehlmann | |
| 4,325,197 A * | 4/1982 | Achten et al. | 40/610 |
| 4,444,240 A | 4/1984 | Bannister | |
| 4,471,548 A * | 9/1984 | Goudie | 40/610 |
| 4,479,340 A | 10/1984 | Alphonse et al. | |
| 4,736,490 A * | 4/1988 | Wesselski | B64G 1/641 |
| | | | 16/292 |
| 4,942,686 A | 7/1990 | Kemeny | |
| 4,999,938 A | 3/1991 | Behling | |
| 5,058,239 A * | 10/1991 | Lee | E06C 1/32 |
| | | | 16/324 |
| 5,340,065 A * | 8/1994 | Thomas | 248/150 |
| 5,393,018 A * | 2/1995 | Roth | B64G 1/222 |
| | | | 136/245 |
| 5,501,051 A | 3/1996 | Harlan | |
| 5,685,660 A * | 11/1997 | Liao | E05D 11/1007 |
| | | | 384/585 |
| 6,334,687 B1 | 1/2002 | Chino et al. | |
| 6,370,803 B1 * | 4/2002 | Burquest | 40/607.04 |
| 6,393,748 B1 * | 5/2002 | Cooper | 40/610 |
| 6,466,369 B1 * | 10/2002 | Maddock | 359/460 |
| 6,606,809 B2 | 8/2003 | Hillstrom et al. | |
| 6,711,780 B2 * | 3/2004 | Lee | E06C 1/32 |
| | | | 16/326 |
| 6,870,672 B2 | 3/2005 | Stumpfl | |
| 7,062,872 B2 | 6/2006 | Williams et al. | |
| 7,234,203 B2 * | 6/2007 | Latimer | E04F 11/064 |
| | | | 16/231 |
| 7,254,869 B2 | 8/2007 | You | |
| 7,314,199 B1 | 1/2008 | Ward | |
| 8,024,881 B2 | 9/2011 | Redmon | |
| 8,365,450 B1 | 2/2013 | Redmon | |
| 8,776,416 B1 | 7/2014 | Redmon | |
| 2003/0037412 A1* | 2/2003 | Lee | E06C 1/32 |
| | | | 16/326 |

FOREIGN PATENT DOCUMENTS

| | | |
|---|---|---|
| JP | 3001574 U | 1/1991 |
| JP | 3086722 U | 9/1991 |
| JP | 06-018988 A | 1/1994 |
| JP | 06-235974 A | 8/1994 |
| JP | 08-292497 A | 11/1996 |
| JP | 2000131766 A | 5/2000 |
| JP | 2002507098 A | 3/2002 |
| JP | 2002209639 A | 7/2002 |
| WO | WO 03/104888 | 6/2003 |

OTHER PUBLICATIONS

Supplementary European Search Report: Jan. 29, 2009; 2 pages; European Patent Office; The Neatherlands.
Draper, Inc., "Tripod and Portable Screens" brochure, 2003, U.S.A.
AV STUMPFL, "Projection Screens—Mobile and Permanent," Edition Photokina 2002.
AV-STUMPFL, News 2001#01 (dated Feb. 8, 2001).
Draper, Inc., "Products for Visual Communication," 2002, USA.
DA-LITE Screen Company, Inc., "The Power in Presentation Products," 2001, USA.
AV-STUMPFL, "Presentation Technology is Changing," Edition Photokina 2000.
AV-STUMPFL, "Presentation Technology Changes. Soon," 1999 English edition.
The Screen Works, "E-Z Fold & E_Z Fold III," date unknown.
Description of AV Stumpfl snap joint (includes 8 photos); date unknown.

* cited by examiner

METHOD FOR DISPLAYING AN IMAGE

RELATED APPLICATIONS

This application is a continuation of U.S. patent application Ser. No. 13/758,377, now U.S. Pat. No. 8,776,416, titled Lock for Frame, to Shanon O. Redmon, filed Feb. 4, 2013, which is a continuation of U.S. patent application Ser. No. 13/245,417, now U.S. Pat. No. 8,365,450, titled Lock for Frame, to Shanon O. Redmon, filed Sep. 26, 2011, which is a continuation of U.S. patent application Ser. No. 11/070,071, now U.S. Pat. No. 8,024,881, titled Lock for Frame, to Shanon O. Redmon, filed Mar. 2, 2005, which claims the benefit of U.S. Provisional Application Ser. No. 60/551,812, filed Mar. 10, 2004, the disclosures of which are expressly incorporated by reference herein.

FIELD

The present invention relates to a method for displaying an image. More particularly, the present invention relates to a method for setting up and taking down tensioned projection screens.

BACKGROUND AND SUMMARY OF THE INVENTION

Projection screens for displaying images are known. Some projections screens are configured to be set up and taken down to facility use and storage of the projection screens when not in use.

According to one aspect of the present disclosure, a method of preparing a projection screen to display an image is provided. The method includes the steps of providing a projection screen including a screen and a frame system. The frame system has a plurality of frame members, hinges coupling adjacent frame members together, and locks positioned to block movement of the frame members coupled together by the hinges. The method further includes the steps of unfolding the frame system, coupling the screen to the frame system, and positioning the frame system in a substantially vertical position, wherein during the unfolding step, portions of the locks move within apertures formed in sides of the plurality of the frame members.

According to another aspect of the present disclosure, a method of preparing a projection screen to display an image is provided. The method includes the steps of providing a projection screen including a screen and a frame system. The frame system has a plurality of frame members, hinges coupling adjacent frame members together, and locks positioned to block movement of the frame members coupled together by the hinges. The method further includes the steps of unfolding the frame system, coupling the screen to the frame system, and positioning the frame system in a substantially vertical position, wherein during the unfolding step, portions of the locks move within apertures formed in ends of the plurality of the frame members.

According to another aspect of the present disclosure, a method of preparing a projection screen to display an image is provided. The method includes the steps of providing a projection screen including a screen and a frame system. The frame system has a plurality of frame members, hinges coupling adjacent frame members together, and locks positioned to block movement of the frame members coupled together by the hinges. The method further includes the steps of unfolding the frame system, coupling the screen to the frame system, and positioning the frame system in a substantially vertical position, wherein during the unfolding step, portions of the locks move within apertures formed in sides of the plurality of the frame members.

According to another aspect of the present disclosure, a method of preparing a projection screen to display an image is provided. The method includes the steps of providing a projection screen including a screen and a frame system. The frame system has a plurality of frame members, hinges coupling adjacent frame members together, and locks positioned to block movement of the frame members coupled together by the hinges. The method further includes the steps of unfolding the frame system, coupling the screen to the frame system, and positioning the frame system in a substantially vertical position, wherein during the unfolding step, portions of the locks move from being positioned outside of at least one of the plurality of frame members to being positioned inside said at least one of the plurality of frame members.

According to another aspect of the present disclosure, a method of preparing a projection screen for storage is provided. The method comprising the steps of providing a projection screen including a screen and a frame system. The frame system has a plurality of frame members, hinges coupling adjacent frame members together, and locks positioned to block movement of the frame members coupled together by the hinges. The method further includes the steps of uncoupling the screen from the frame system, unlocking the plurality of frame members by applying force to the locks through apertures formed in sides of the plurality of frame members, and folding the plurality of frame members about the hinges.

According to another aspect of the present disclosure, a method of preparing a projection screen for storage is provided. The method includes the steps of providing a projection screen including a screen and a frame system. The frame system has a plurality of frame members, hinges coupling adjacent frame members together, and locks positioned to block movement of the frame members coupled together by the hinges. The method further includes the steps of uncoupling the screen from the frame system, unlocking the plurality of frame members by rotating at least a portion of the locks within interiors of the plurality of frame members, and folding the plurality of frame members about the hinges.

BRIEF DESCRIPTION OF THE DRAWINGS

A detailed description particularly refers to the accompanying figures in which.

DETAILED DESCRIPTION OF THE DRAWINGS

According to the present disclosure, a display or projection screen apparatus system 10 is provided to display images projected by a projector (not shown). Typically, projection screen apparatus 10 is supported on the floor of a building or other structure. Projection screen apparatus 10 may be used in either front or rear projection applications. In some applications, speakers (not shown) are positioned behind the projection screen apparatus 10 so that the sound is transmitted through projection screen apparatus 10.

Figure 1:
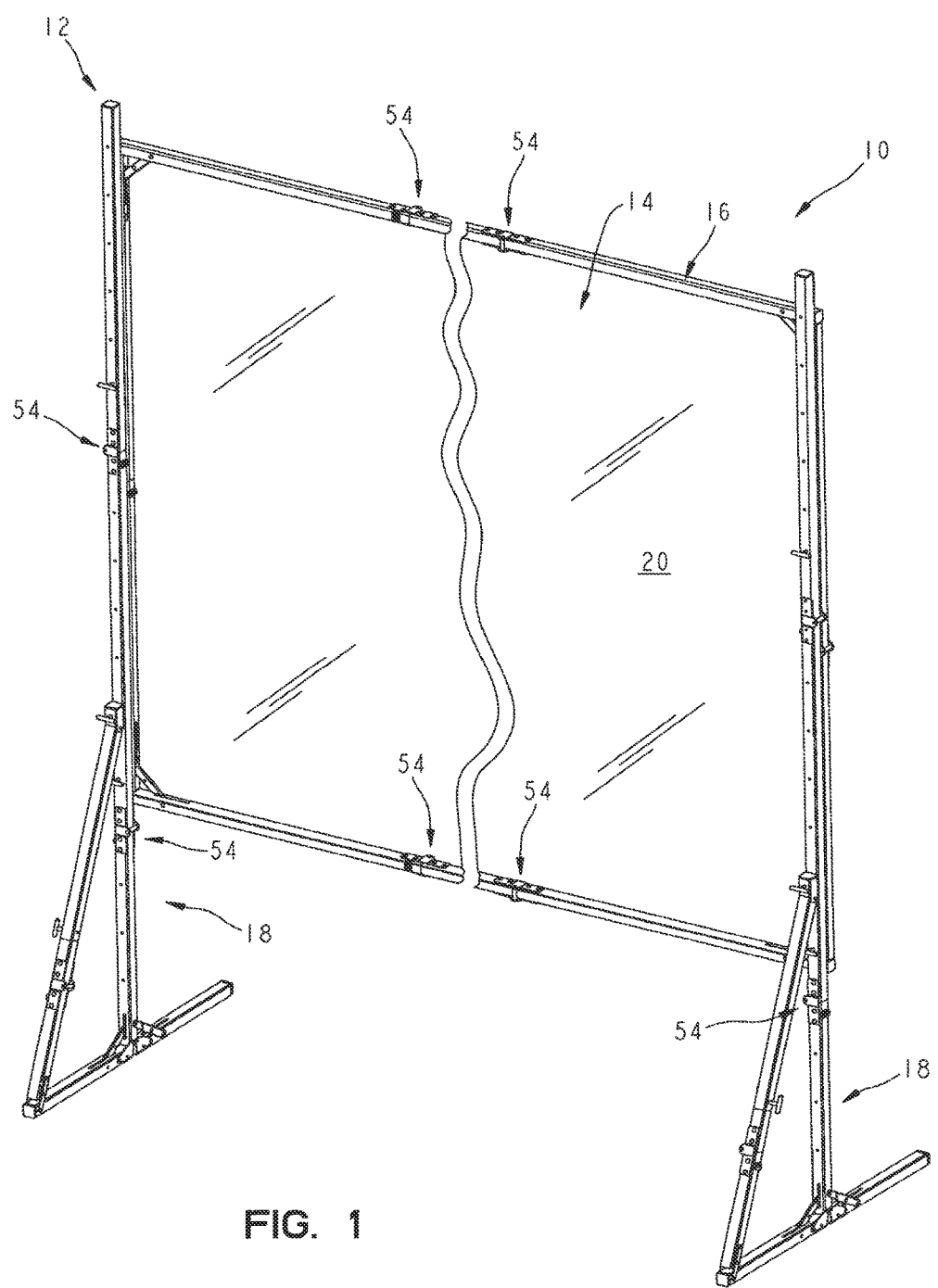
FIG. 1 is a rear perspective view of a projection screen apparatus showing the projection screen apparatus including a frame system having a pair of support legs and a rectangular screen frame supported by the legs and a projection screen coupled to the screen frame.
Figure 2:
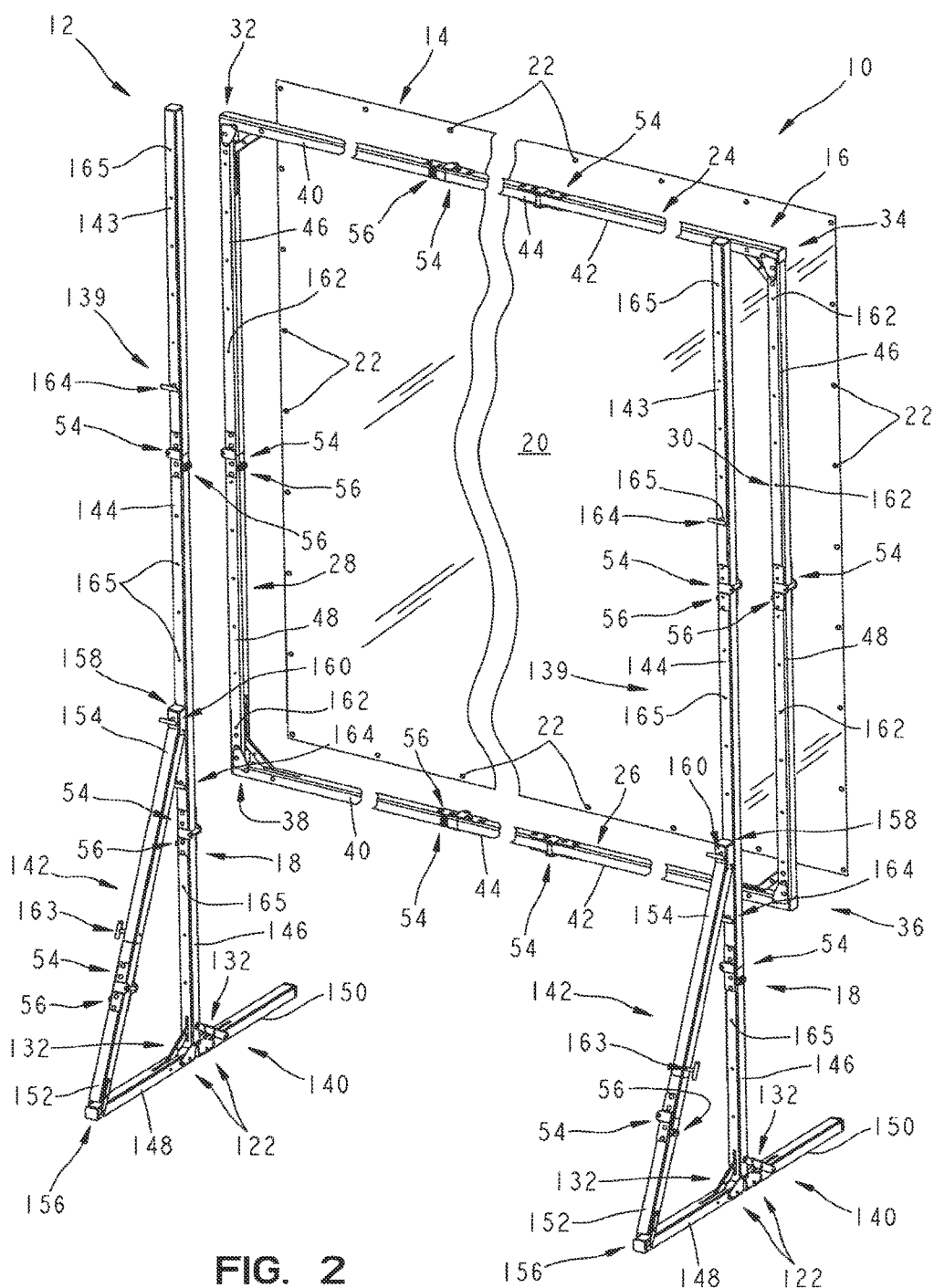
FIG. 2 is an rear exploded perspective view of the projection screen apparatus showing the frame system and the projection screen including a screen fabric and a plurality of snaps configured to couple the screen fabric to the screen frame.

As shown in FIG. 2, projection screen apparatus 10 includes a frame system 12 and a projection screen 14. Frame system 12 includes a rectangular screen frame 16 and a pair of support legs 18 that support frame 16 at an elevated position. Projection screen 14 include screen fabric 20 and a plurality of couplers or snaps 22 that couple screen fabric 20 on frame 16. When coupled to frame 16, projection screen 14 is tensioned on frame 16 to provide a substantially flat viewing surface (not shown).

Typically, screen fabric 20 is blank to reflect or otherwise show an image provided by a projector. According to one embodiment, screen fabric 20 of display system 10 is provided with printed or other types of graphics used for advertisements or other information or aesthetic purposes. Screen fabric 20 is preferably made of vinyl. According to other embodiments, other fabrics are provided such as those disclosed in U.S. Provisional Patent Application Ser. No. 60/546,410, titled Reinforced Projection Screen Fabric, to Jerry L. McPherson, Jr., filed Feb. 20, 2004, the disclosure of which is expressly incorporated herein by reference, or U.S. patent application Ser. No. 10/327,421, titled Tensioned Projection Screen, to Kenneth M. Risher, filed Dec. 12, 2002, the disclosure of which is expressly incorporated herein by reference, and other fabrics known to those of ordinary skill in the art. According to other embodiments, other coupling devices are provided for coupling the screen fabric to the screen frame. For example, according to other embodiments, the coupling system disclosed in U.S. patent application Ser. No. 10/327,421, titled Tensioned Projection Screen, to Kenneth M. Risher, filed Dec. 20, 2002, the disclosure of which is expressly incorporated herein by reference, hook-and-loop fastener strips, adhesive, stay-puts, and other known coupling devices or methods are provided.

Figure 10:
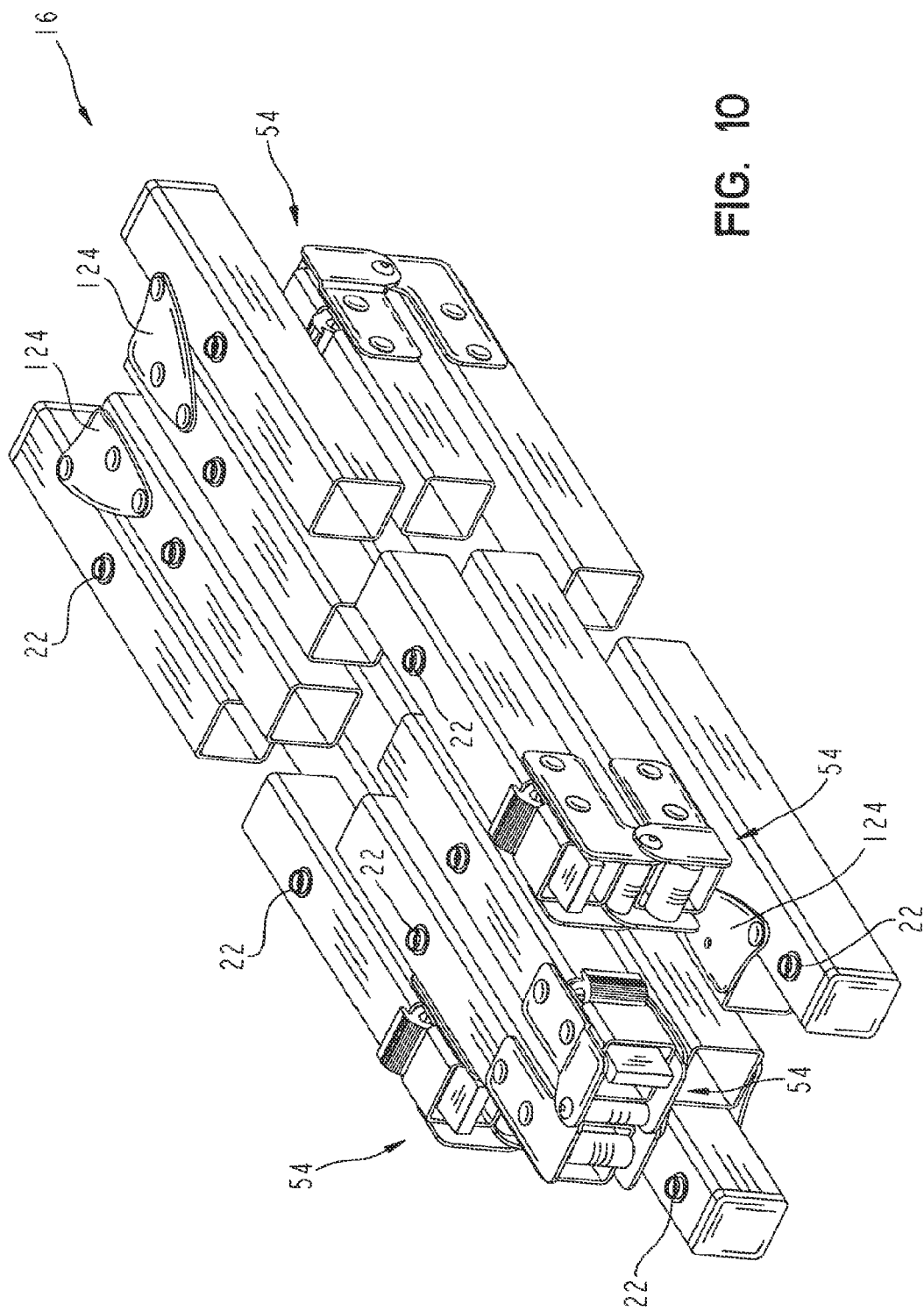
FIG. 10 is a perspective view of the rectangular screen frame of FIG. 1 showing the frame, with portions broken away, in a collapsed or folded position for storage or transportation.

Frame 16 includes top, bottom, left, and right assemblies 24, 26, 28, 30 that meet to define first, second, third, and fourth corners 32, 34, 36, 38 as shown in FIG. 2. To facilitate storage and/or transportation, assemblies 24, 26, 28, 30 each fold or "break down" so that frame 16 is a more compact unit as shown in FIG. 10.

Figure 4:
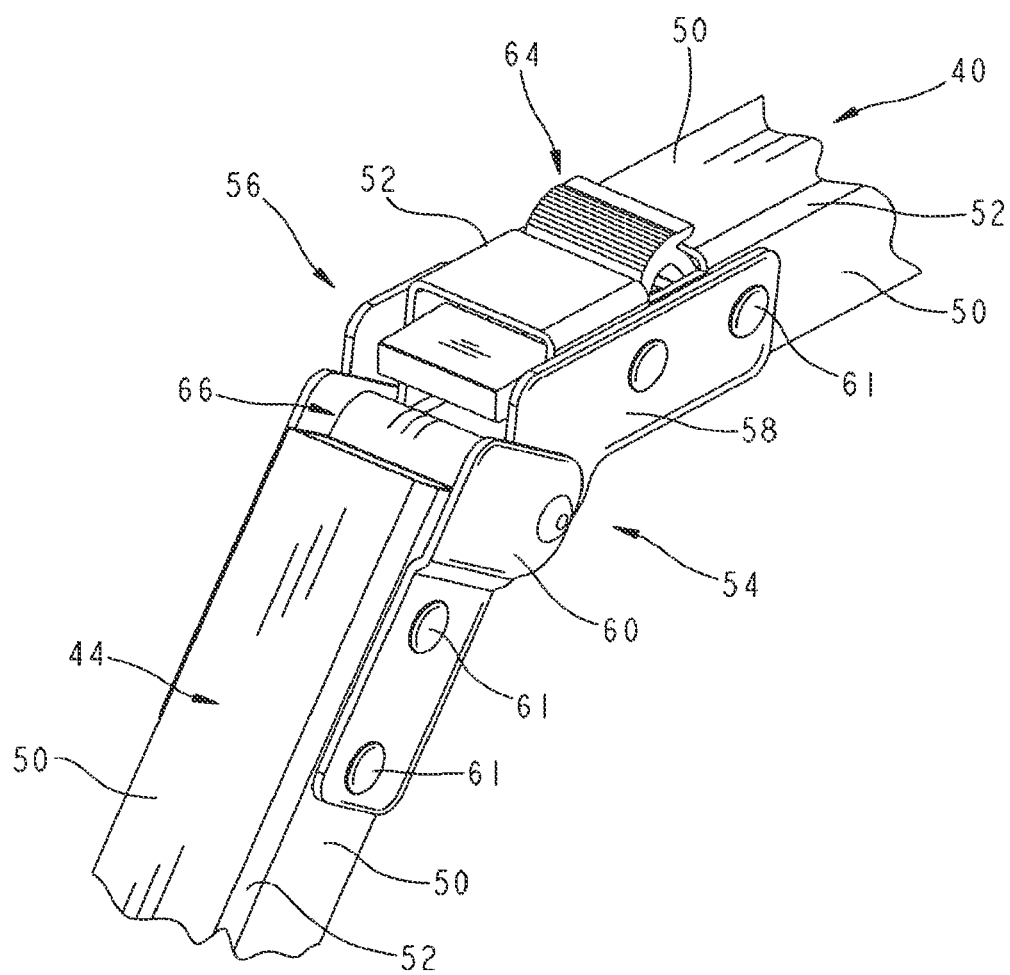
FIG. 4 is a similar to FIG. 3 showing the lock in an unlocked position permitting the frame members to pivot on the hinge.

Top and bottom assemblies 24, 26 each include right, left, and middle tubular frame members 40, 42, 44. Left and right assemblies 28, 30 each include top and bottom tubular frame members 46, 48. Each frame member 40, 42, 44, 46, 48 is made of extruded aluminum having four substantially flat sidewalls 50 and four rounded corners 52 as shown in FIG. 4 that cooperate to define an outer wall and two ends of each frame member 40, 41, 44, 46, 48.

Top, bottom, left, and right assemblies 24, 26, 28, 30 also include hinges 54 between right and left frame members 40, 42 and middle frame members 44 and between top and bottom frame members 46, 48. Hinges 54 provide for pivoting between the respective frame members 40, 42, 44, 46, 48.

Figure 3:
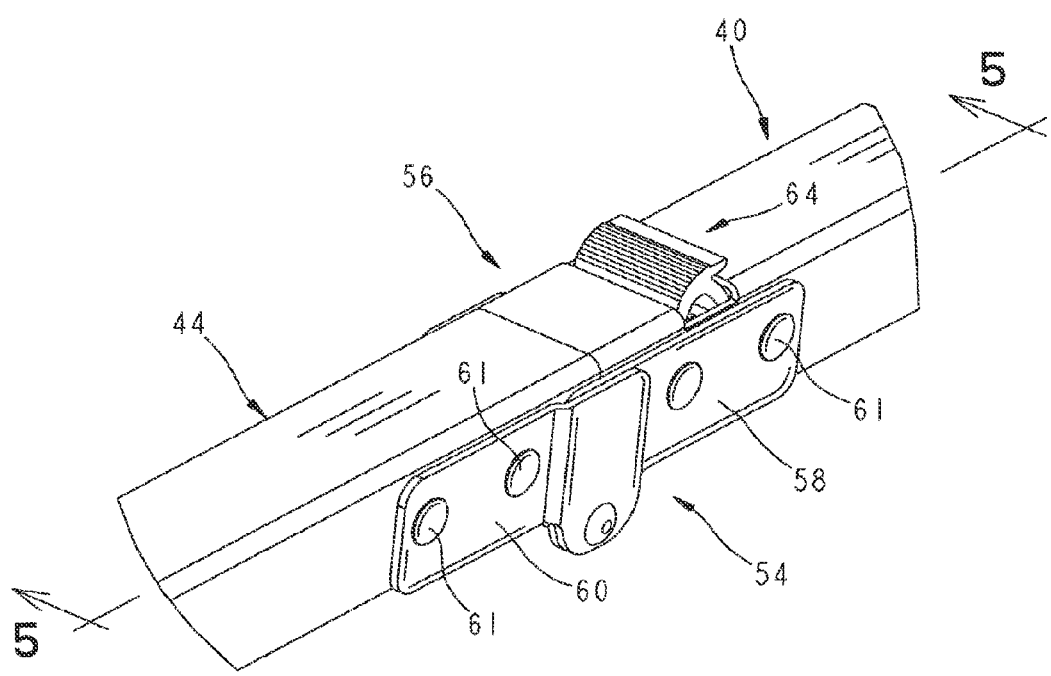
FIG. 3 is a perspective view of a portion of the screen frame showing the screen frame including a pair of frame members, with portions broken away, a hinge pivotally coupling the frame members together, and a lock in a locked position blocking pivoting of the frame members.

Top, bottom, left, and right assemblies 24, 26, 28, 30 also include locks 56 between right and left frame members 40, 42 and middle frame members 44 and between top and bottom frame members 46, 48. Locks 56 are positioned in a passage defined by respective frame members 40, 42, 44, 46, 48 and block pivoting movement of these respective frame members 40, 42, 44, 46, 48 during setup and use of projection screen apparatus 10 as shown in FIG. 3 for exemplary frame members 40, 44. When it is time to store or transport screen apparatus 10, lock 56 is moved to an unlocked position so that frame members 40, 44 can pivot about hinge 54 as shown in FIG. 4.

Figure 9:
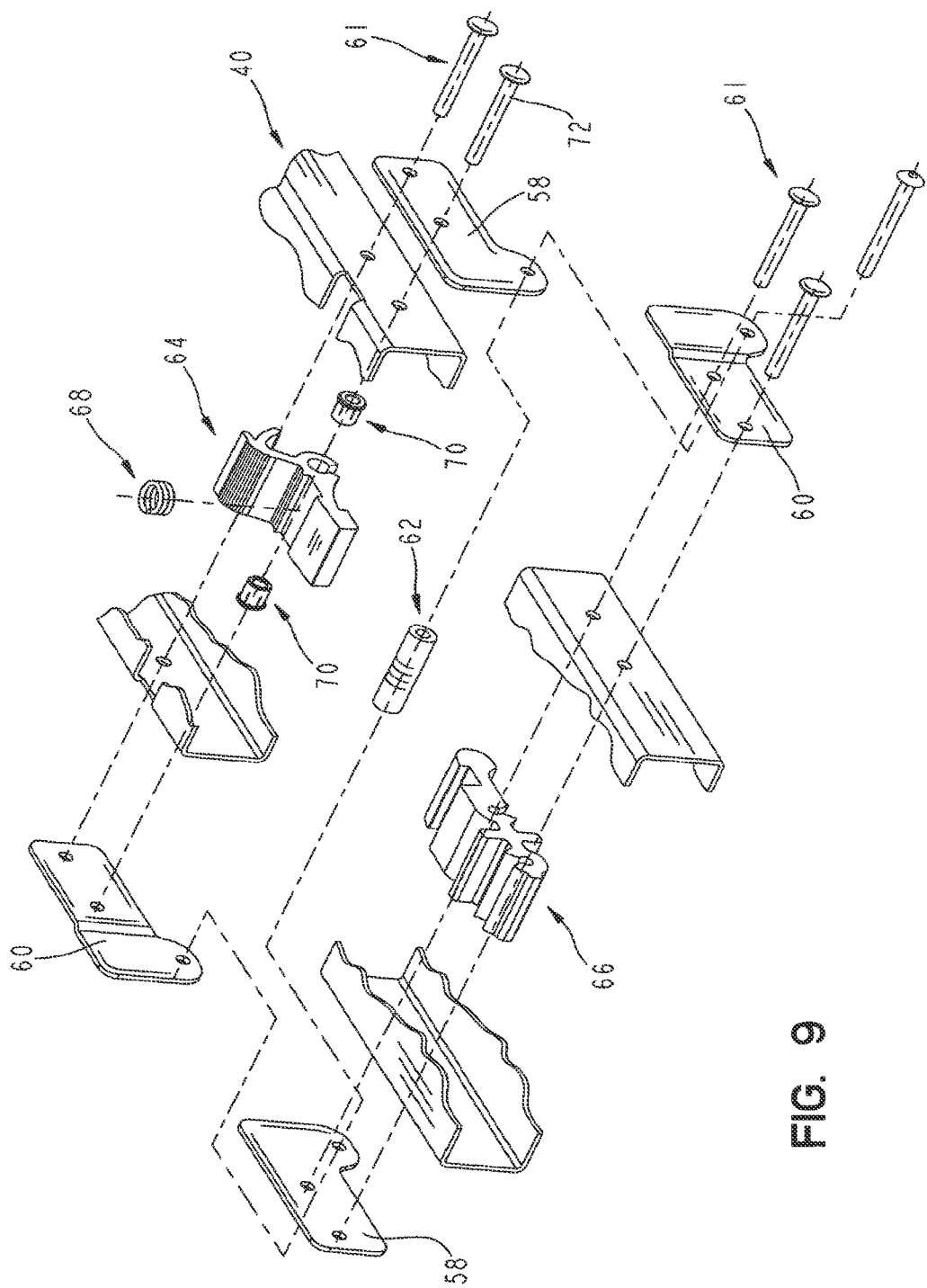
FIG. 9 is an exploded perspective view of the frame members and lock of FIG. 3.

As shown in FIG. 9, hinge 54 includes two inner hinge plates or members 58 rigidly coupled to respective frame members 40, 42, 44, 46, 48, two outer hinge plates or members 60 rigidly coupled to respective frame members 40, 42, 44, 46, 48, a plurality of rivets 61, and a spacer or bushing 62. Inner and outer hinge plates 58, 60 are coupled to frame members 40, 44 by rivets 61. When assembled, outer hinge plates 60 are positioned outside of inner hinge plates 58 and coupled together by rivet 61 with bushing 62 positioned over one of rivets 61 between inner hinge plates 58. The outer diameter or width of bushing 62 is greater than a distance between the ends of respective frame members 40, 42, 44, 46, 48 when aligned as shown in FIG. 3. When respective frame members 40, 42, 44, 46, 48 are aligned, each hinge plate 58, 60 overlaps two of the respective frame members 40, 42, 44, 46, 48 as shown in FIG. 3 for frame members 40, 44. Furthermore, inner hinge plates 58 are sandwiched between outer hinge plates 60 and respective frame members 40, 42, 44, 46, 48 as shown in FIG. 3 for frame members 40, 44.

Lock 56 includes first and second lock members or interactive members 64, 66, a biaser or spring 68, a pair of sintered bronze bushings 70, and a rivet or pivot member 72. First interactive member 64 is positioned inside of frame member 40 and pivots about a pivot axis defined by rivet 72 on bushings 70. Second interactive member 66 is positioned inside frame member 44 and held against rotation by rivets 61 that couple inner and outer plates 58, 60 to frame member 44. First and second interactive members 64, 66 are preferably made of extruded aluminum. According to alternative embodiments of the present disclosure, other materials are used such as plastic materials, other metals, and other materials known to those of ordinary skill in the art.

Figure 5:
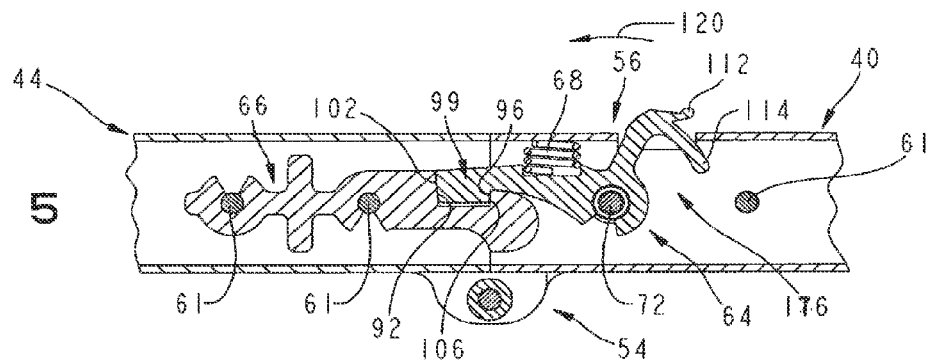
FIG. 5 is a cross-sectional view taken along line 5-5 of FIG. 3 showing the lock including first and second interactive members that interact to block pivoting of the frame members about the hinge.

As shown in FIG. 5, first interactive member 64 engages second interactive member 70 to block relative pivoting of frame members 40, 44. Spring 68 urges first interactive member 64 toward second interactive member 66 to maintain this engagement. When in the locked position, ends of frame members 40, 44 preferably abut so that the distance between frame members 40, 44 is minimal. However, depending upon the precision of the machining and assembly, a small gap may exist between the end of frame members 40, 44 when in the locked position. When in this position, first and second interactive members 64, 70 extend through the ends of each frame member 40, 44 so that a portion of each frame member 40, 44 is positioned within each frame member 40, 44 as shown in FIG. 5.

When locked, frame members 40, 44 cooperate to define a longitudinal axis and define a relatively square transverse profile. Preferably, the majority of lock 56 is positioned within this transverse profile to limit the exposure of lock 56 outside of frame members 40, 44 to avoid interference with screen 14.

Figure 6:
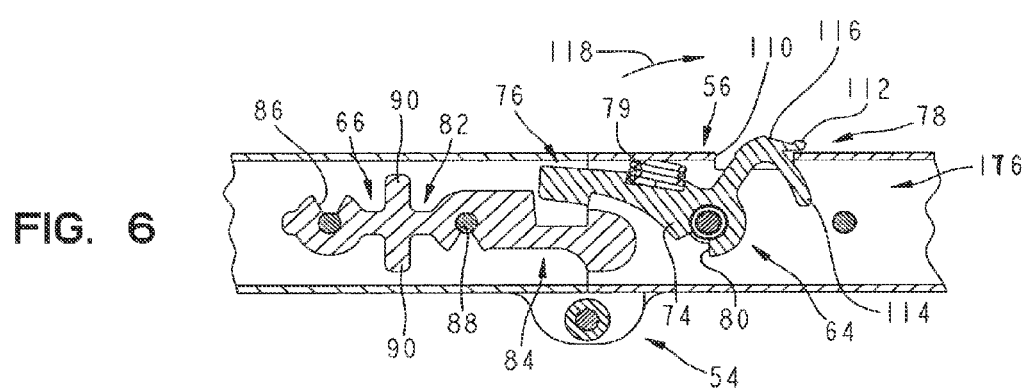
FIG. 6 is view similar to FIG. 5 showing one of the interactive members rotated by a user about a pivot pin to disengage the other interactive member and permit pivoting of the frame members relative to one another.

As shown in FIG. 6, first interactive member 64 includes a body portion 74, a locking portion 76, and a button or release portion 78. Body portion 74 includes a first groove or notch 78 to receive a portion of spring 68 and a second groove or notch 80 to receive portions of pin member 72 and bushings 70.

Second interactive member 66 includes a body portion 82 and a locking portion 84. Body portion 82 includes a pair of grooves 86, 88 to receive portions of rivets 61 and a pair of extension 90. Extensions 90 have a width that is equal to or slightly smaller than the inner width of flat side walls 50 so that extensions 90 are blocked from sliding laterally by inner portions of rounded corners 52. This assists in centering second interactive member 66 within frame member 44 during assembly.

Figure 7:
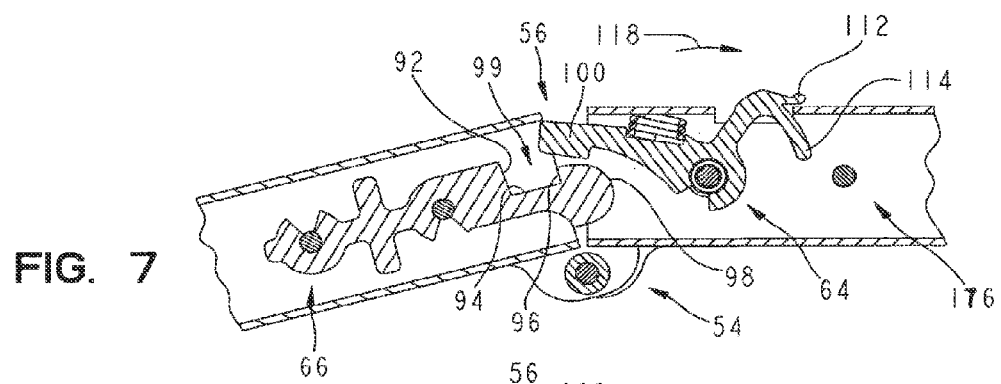
FIG. 7 is view similar to FIG. 5 showing the interactive members disengaged and the frame members rotated relative to one another.

Locking portions 76, 84 of first and second interactive members 64, 66 are shaped to facilitate locking and unlocking of lock 56. Key-receiving or locking portion 84 of second interactive member 66 includes first, second, third, and fourth surfaces 92, 94, 96, 98. As shown in FIG. 7, first, second, and third surfaces 92, 94, 96 are relatively flat and cooperate to define a groove, or notch 99 that receives a key 100 of first interactive member 64. First and second surfaces 92, 94 cooperate to define an angle of 95°. First surface 92 also cooperates with a line (not shown) extending between rivets 61 and pivot member 72 to define an angle of 95° when lock 56 is in the locked position as shown in FIG. 5. Third surface 96 is substantially tangent to the pivot axis defined by pivot member 72.

Key 100 is wedge-shaped and includes first, second, and third relatively flat surfaces 102, 104, 106 and body portion 74 of first interactive member 64 includes a curved surface 108. First and second surfaces 102, 104 cooperate to define and angle of 95°. First surface 102 also cooperates with the line (not shown) extending between rivets 61 and pivot member 72 to define an angle of 95° when lock 56 is in the locked position as shown in FIG. 5. Third surface 106 is substantially tangent to pivot axis defined by pivot member 72.

When first and second interactive members 64, 66 are in the locked position, first surface 102 of first interactive member 64 abuts first surface 92 of second interactive member 66 as shown in FIG. 5. This abutment prevents frame member 44 from pivoting any further toward frame member 40 so that frame members 40, 44 have little, if any, "play" therebetween even if a gap exists between frame members 40, 44. Similarly, third surface 106 of first interactive member 64 abuts third surface 96 of second interactive member 66 to block frame member 44 from pivoting away from frame member 40 to block pivoting between frame members 40, 44.

To unlock lock 56, a user presses down on release portion 78 of first interactive member 64 that extends through an aperture 110 formed in frame member 40. Release portion 78 includes a first extension or portion 112 that extends outside of the relatively square transverse profile and second extension 114 partially positioned within and partially outside the relatively square transverse profile. Preferably, upper surface 116 of release portion 78 and first extension 112 include a plurality of ridges, shown in FIG. 4, that provide traction for the user's thumb or finger. The force applied to first extension 112 by the users thumb or finger is transmitted through aperture 110.

First extension 112 limits the rotation of first interactive member 64 in direction 118 as shown in FIGS. 6 and 7. Similarly, second extension 114 blocks rotation of first interactive member 64 in direction 120 as shown in FIG. 5. Second extension 114 also blocks objects from entering an interior 116 of frame member 40 through aperture 110.

By having the 95° angles, key 100 of first interactive member 64 and notch 99 of second interactive member 66 are slightly wedge-shaped and key 100 is less likely to catch on second interactive member 66 than if the angles were 90°. According to other embodiments of the present disclosure, other angles are provided such as 90°, 92.5°, 97.5°, and 100°. Curved surface 108 of first interactive member 64 provides clearance for curved surface 98 of second interactive member 66.

When first interactive member 64 is moved to the position shown in FIG. 6, first and second frame members 40, 44 can be pivoted relative to one another up to 180° so that first and second frame members 40, 44 are positioned adjacent one another as shown in FIG. 10.

Figure 8:
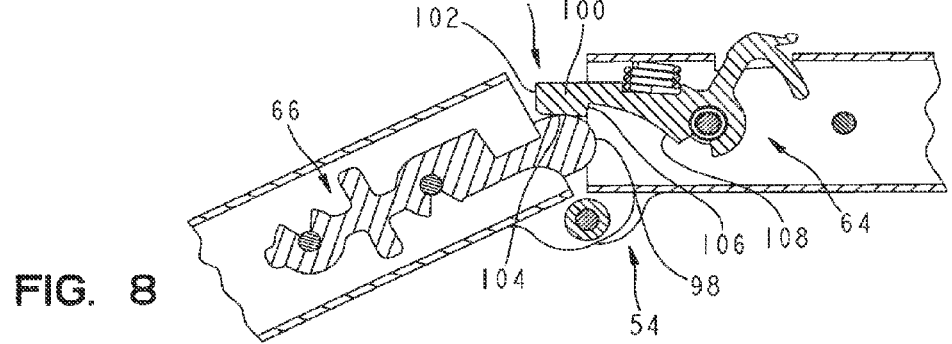
FIG. 8 is a view similar to FIG. 5 showing one of the interactive members sliding over the other interactive member during pivoting of the frame members toward the position show in FIG. 5.

To unfold frame members 40, 44, they are rotated back toward each other about hinge 54. Second surface 104 of key 100 rides over curved fourth surface or cam 98 of second interactive member 66 as shown in FIG. 8 until key 100 falls into notch 99 as shown in FIG. 5.

Figure 11:
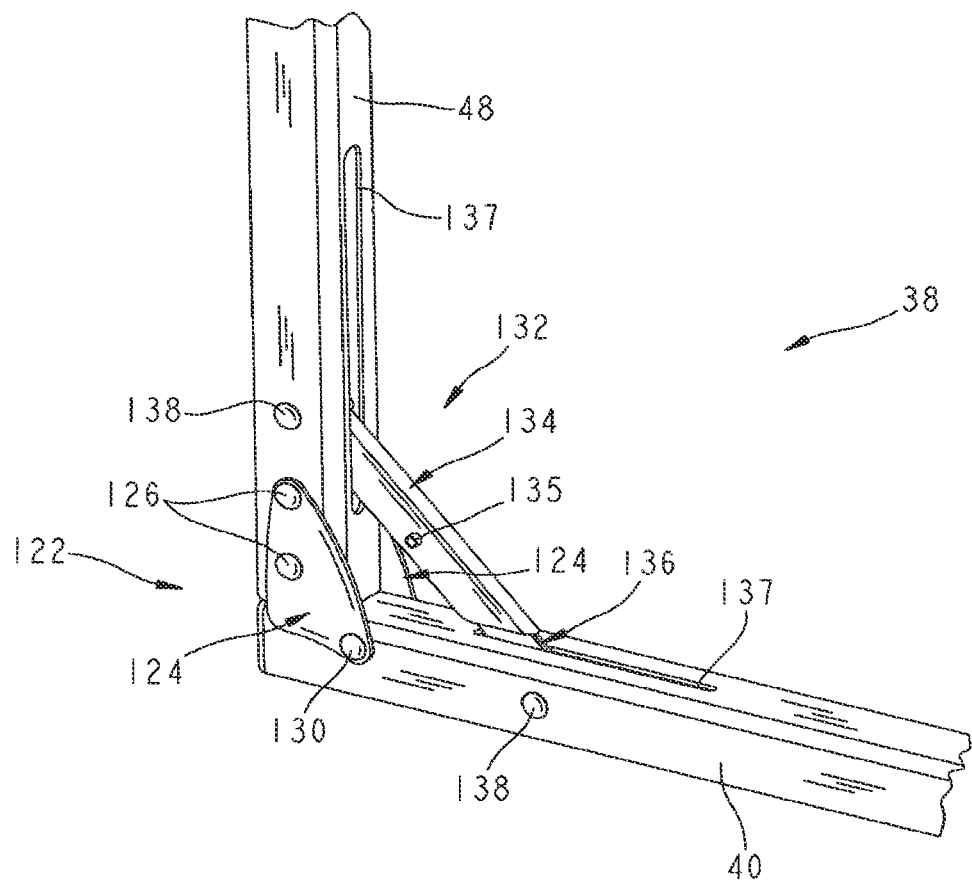
FIG. 11 is a perspective view of a corner of the screen frame showing the frame include a pair of frame members, with portions broken away, a hinge pivotally coupling the frame members together, and a lock blocking pivoting movement of the frame members relative to one another.

As shown in FIG. 11, hinges 122 are provided at each corner 32, 34, 36, 38 of frame 16. Hinges 122 include a pair of hinge plates 124, a first pair of rivets 126 that couple hinge plates 124 to exemplary frame member 48, and a pivot member 130 that pivotally couples hinge plates 124 to exemplary frame member 40.

A lock 132 is provided at each corner 32, 34, 36, 38 that blocks relative rotation of the respective frame members 40, 44, 46, 48. Each lock 132 includes first and second lock members 134, 136, a pivot member 135 that pivotally couples lock members 134, 136 together, and a pair of pivot members 138 that pivotally couple the respective lock members 134, 136 to respective frame members 40, 44, 46, 48 as shown in FIG. 11 for exemplary frame members 40, 48. First lock member 134 is U-shaped to receive a portion of second lock member 136. Each frame member 40, 48 includes a slot 137 in which lock members 134, 136 are positioned when frame 16 is folded. To unlock lock 132, lock members 134, 136 are pushed or pulled away from hinge 122. To lock lock 132, lock members 134, 136 are pushed or pulled toward hinge 122.

As shown in FIG. 2, each leg 18 includes an upright 139, a base 140, and a brace 142. Upright 139 includes three tubular frame members 143, 144, 146 similar to frame members 40, 42, 44, 46, 48 and locks 56 between frame members 143, 144, 146. Base 140 includes two tubular frame members 148, 150 similar to frame members 40, 42, 44, 46, 48. Hinges 122 and lock 132 are provided between upright 139 and frame members 148, 150 to provide for pivoting movement and locking between upright 139 and frame members 148, 150. One lock 132 is positioned in the interior regions of frame members 146, 148 and one lock 132 is positioned on the exterior of frame members 146, 150 as shown in FIG. 2.

Brace 142 includes two tubular frame members 152, 154 similar to frame members 40, 42, 44, 46, 48, a lock 54 between frame members 152, 154, a hinge 156 between frame member 152 and base frame member 148, and a coupling member 158 pivotally coupled to frame member 154. A threaded knob 160 is provided that releasably couples member 158 to frame member 144. Frame member 154 is divided into two separate pieces and includes a telescoping member (not shown) positioned therein to permit the length of frame member 154 to be extended or retracted. Another knob 163 is provided to block extension or retraction of frame member 154 when tightened and to allow extension or retraction of frame member 154 when loosened.

Frame members 46, 48 of frame 16 include a plurality of threaded apertures 162 that receive knobs 164. To adjust the height of frame 16, knobs 164 are unscrewed, aligned with the next set of lower or higher apertures 162, and screwed into said apertures 162. If necessary, knobs 164 can be removed from legs 18 and repositioned in other locations in the provided apertures 165.

To store screen apparatus 10, frame 16 is uncoupled from legs 18 by unscrewing knobs 164; screen 14 is removed from frame 16; each lock 54, 132 of frame 16 is unlocked and frame members 40, 42, 44, 46, 48 are folded 90° or 180° to the position shown in FIG. 10; knob 160 of legs 18 are unscrewed; each lock 54, 132 of legs 18 are unlocked; and frame members 142, 144, 146, 148, 150, 152, 154 are folded 90° or 180°. To setup screen apparatus 10, the above steps are done in reverse order.

Preferably, instructions for the assembly, installation, and/or use of projection screen apparatus 10 are provided with projection screen apparatus 10 or otherwise communicated to permit a person or machine to assemble, install and/or use projection screen apparatus 10. Such instructions may include a description of any or all portions of projection screen apparatus 10 and/or any or all of the above-described assembly, installation, and use of projection screen apparatus 10 or components of projection screen apparatus 10. The instructions may be provided on separate papers and/or on the packaging in which projection screen apparatus 10 is sold or shipped. These instructions may also be provided over the Internet or other communication system. Furthermore, the instructions may be embodied as text, pictures, audio, video, or any other medium or method of communicating instructions known to those of ordinary skill in the art.

Although the present invention has been described in detail with reference to preferred embodiments, variations and modifications exist within the scope and spirit of the present invention as described and defined in the following claims.

The invention claimed is:

1. A method of preparing a projection screen to display an image, the method including the steps of:
providing a projection screen including a screen and a frame system, the frame system having a plurality of frame members, hinges coupling adjacent frame members together, and locks positioned to block movement of the frame members coupled together by the hinges, each lock having a first lock member and a second lock member,
unfolding the frame system which results in the locks being freely transitioned into locked configurations,
coupling the screen to the frame system, and
positioning the frame system in a substantially vertical position, wherein during the unfolding step, the first lock member pivots about a pivot axis, the second lock member remains stationary within the frame member, and portions of the locks move within apertures formed in sides of the plurality of the frame members.

2. The method of claim 1, wherein the portions of the locks rotate in a first direction during movement within the apertures formed in the sides of the plurality of frame members.

3. The method of claim 2, wherein the portions of the locks rotate in a second direction during movement within the apertures formed in the sides of the plurality of frame members.

4. A method of preparing a projection screen to display an image, the method including the steps of:
providing a projection screen including a screen and a frame system, the frame system having a plurality of frame members, hinges coupling adjacent frame members together, and locks positioned to block movement of the frame members coupled together by the hinges, each lock having a first lock member and a second lock member,
unfolding the frame system which results in the locks being freely transitioned into locked configurations,
coupling the screen to the frame system, and
positioning the frame system in a substantially vertical position, wherein during the unfolding step, the first lock member pivots about a pivot axis, the second lock member remains stationary within the frame members, and portions of the locks move within apertures formed in ends of the plurality of the frame members.

5. The method of claim 4, wherein the portions of the locks rotate in a first direction during movement within the apertures formed in the ends of the plurality of frame members.

6. The method of claim 5, wherein the portions of the locks rotate in a second direction during movement within the apertures formed in the ends of the plurality of frame members.

7. The method of claim 6, wherein during the unfolding step, portions of the locks move within apertures formed in sides of the plurality of the frame members.

8. A method of preparing a projection screen to display an image, the method including the steps of:
providing a projection screen including a screen and a frame system, the frame system having a plurality of frame members, hinges coupling adjacent frame members together, and locks positioned to block movement of the frame members coupled together by the hinges, a first lock being positioned to block movement of a first frame member and a second frame member being coupled together by a first hinge,
unfolding the frame system, wherein the first lock includes a first lock member carried by the first frame and a second lock member carried by the second frame, during the unfolding of the frame system, the first lock member moves within an interior of the first frame, and the second lock member remains stationary within the second frame member, coupling the screen to the frame system, and positioning the frame system in a substantially vertical position, wherein during the unfolding step, portions of the locks move within apertures formed in sides of the plurality of the frame members.

9. The method of claim 8, wherein the portions of the locks rotate in a first direction during movement within the apertures formed in the sides of the plurality of frame members.

10. The method of claim 9, wherein the portions of the locks rotate in a second direction during movement within the apertures formed in the sides of the plurality of frame members.

11. A method of preparing a projection screen to display an image, the method including the steps of:

providing a projection screen including a screen and a frame system, the frame system having a plurality of frame members, hinges coupling adjacent frame members together, and locks positioned to block movement of the frame members coupled together by the hinges, wherein a first lock has a first lock member and a second lock member, unfolding the frame system which results in the locks being freely transitioned into locked configurations, coupling the screen to the frame system, and positioning the frame system in a substantially vertical position, wherein during the unfolding step, the first lock member pivots about a pivot axis, the second lock member remains stationary and portions of the locks move from being positioned outside of at least one of the plurality of frame members to being positioned inside said at least one of the plurality of frame members.

12. A method of preparing a projection screen for storage, the method including the steps of:

providing a projection screen including a screen and a frame system, the frame system having a plurality of frame members, hinges coupling adjacent frame members together, and locks positioned to block movement of the frame members coupled together by the hinges, each lock including a first lock member and a second lock member, uncoupling the screen from the frame system, unlocking the plurality of frame members by applying force to actuate internal portions of the locks through apertures formed in sides of the plurality of frame members, wherein during the unlocking step, the first lock member pivots about a pivot axis and the second lock member remains stationary, and folding the plurality of frame members about the hinges.

13. The method of claim 12, wherein the force applied to the locks through the apertures creates torque on the internal portions of the locks causing the internal portions of the locks to rotate relative to the plurality of frame members.

14. The method of claim 12, wherein the force originates outside of interior regions of the plurality of frame members and disengages the internal portions of the locks positioned within the interior regions of the plurality of frame members.

15. A method of preparing a projection screen for storage, the method including the steps of:

providing a projection screen including a screen and a frame system, the frame system having a plurality of frame members, hinges coupling adjacent frame members together, and locks positioned to block movement of the frame members coupled together by the hinges, a first lock being positioned to block movement of a first frame member and a second frame member coupled together by a first hinge, uncoupling the screen from the frame system, unlocking the plurality of frame members by rotating at least a portion of the locks within interiors of the plurality of frame members, wherein the first lock includes a first lock member carried by the first frame and a second lock member carried by the second frame, during the unlocking of the first lock, the first lock member rotates within an interior of the first frame member and the second lock member remains stationary within an interior of the second frame member, and folding the plurality of frame members about the hinges.

16. The method of claim 15, wherein during the unlocking step, the portions of the locks rotate relative to the frame members about first and second axes of rotation.

17. The method of claim 16, wherein the first axis of rotation extends through an interior of the plurality of frame members and the second axis of rotation is spaced apart from the interior of the plurality of frame members.

* * * * *